(12) United States Patent
Casado Montero et al.

(10) Patent No.: US 10,640,191 B2
(45) Date of Patent: May 5, 2020

(54) DRAIN MAST OF AN AIRCRAFT

(71) Applicant: Airbus Operations S.L., Getafe (ES)

(72) Inventors: Carlos Casado Montero, Getafe (ES); José Ángel Hernanz Manrique, Getafe (ES); Alberto Molina Parga, Getafe (ES)

(73) Assignee: AIRBUS OPERATIONS S.L., Getafe (ES)

(*) Notice: Subject to any disclaimer, the term of this patent is extended or adjusted under 35 U.S.C. 154(b) by 335 days.

(21) Appl. No.: 15/787,202

(22) Filed: Oct. 18, 2017

(65) Prior Publication Data

US 2018/0111673 A1    Apr. 26, 2018

(30) Foreign Application Priority Data

Oct. 20, 2016 (EP) ..................... 16382476

(51) Int. Cl.
*B64C 1/14* (2006.01)
*B64D 41/00* (2006.01)

(52) U.S. Cl.
CPC ............ *B64C 1/1453* (2013.01); *B64D 41/00* (2013.01)

(58) Field of Classification Search
CPC ................. B64C 1/1453; B64D 41/00; B64D 2041/002; B64D 1/16; B64D 1/18; B64D 1/20
USPC ........................................................ 244/136
See application file for complete search history.

(56) References Cited

U.S. PATENT DOCUMENTS

| | | | |
|---|---|---|---|
| 2002/0088901 A1 | 7/2002 | Moreland | |
| 2010/0032525 A1* | 2/2010 | Piesker | B64C 1/1453 244/136 |
| 2013/0193271 A1 | 8/2013 | Otero et al. | |
| 2015/0021438 A1 | 1/2015 | Casado Montero et al. | |

FOREIGN PATENT DOCUMENTS

| | | | | |
|---|---|---|---|---|
| EP | 2620361 | | 7/2013 | |
| EP | 2829469 | | 1/2015 | |
| GB | 486983 | | 6/1938 | |
| GB | 2376269 | A * | 12/2002 | ........... B64C 1/1453 |
| WO | 0230745 | | 4/2002 | |

OTHER PUBLICATIONS

European Search Report, dated Apr. 18, 2017, priority document.

* cited by examiner

*Primary Examiner* — Assres H Woldemaryam
*Assistant Examiner* — Nicholas E Brown
(74) *Attorney, Agent, or Firm* — Greer, Burns & Crain, Ltd.

(57) ABSTRACT

A drain mast for draining liquids from an aircraft, comprising a tube that comprises an internal rim connected to the internal surface of the tube, the internal rim being located in a plane inclined with respect to the horizontal plane of the aircraft and having its lowest part located on the second end of the tube, an aperture for evacuating the liquid, the aperture being located at the lowest part of the internal rim and in the face of the tube facing the incoming airflow, the internal rim and the aperture being configured such that at the second end, the liquid is directed by gravity through the internal rim to the aperture and wherein, in use, the drained liquid flowing from the aperture is pushed by the incoming airflow to the atmosphere.

14 Claims, 7 Drawing Sheets

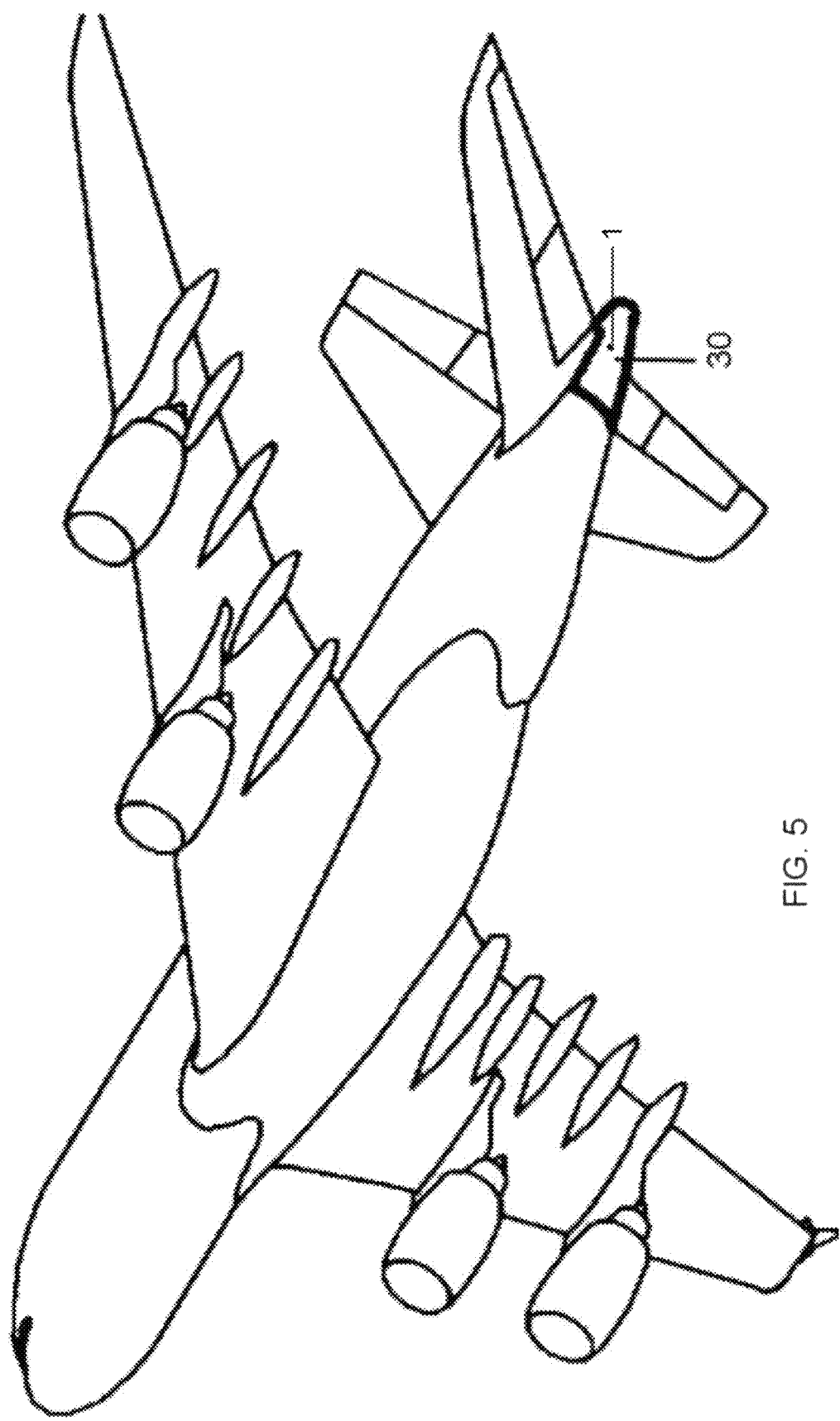

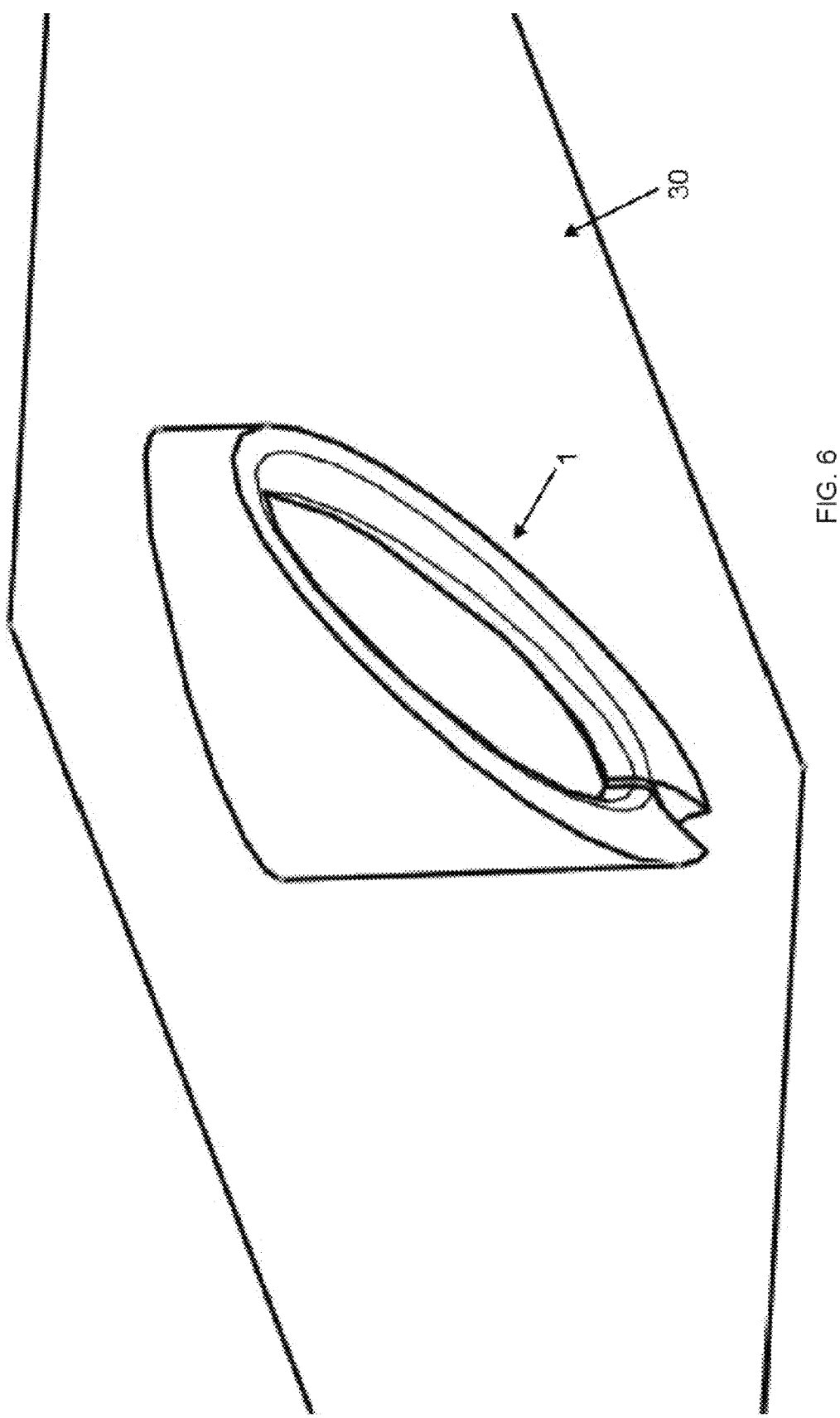

DRAIN MAST OF AN AIRCRAFT

CROSS-REFERENCES TO RELATED APPLICATIONS

Figure 1A:
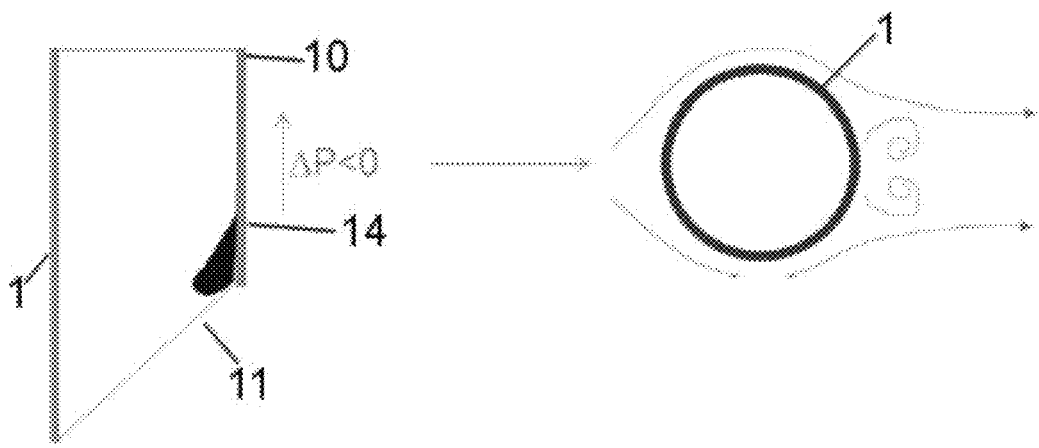

This application claims the benefit of the European patent application No. 16382476.6 filed on Oct. 20, 2016, the entire disclosures of which are incorporated herein by way of reference.

FIELD OF THE INVENTION

The present invention relates to a drain mast for evacuating liquids from different sources of an aircraft, more particularly, to the drain mast of the compartment of an auxiliary power unit (APU).

BACKGROUND OF THE INVENTION

Known drainage systems of the auxiliary power unit (APU) of an aircraft comprise a mast for evacuating any liquid accumulated in the APU compartment to the atmosphere by gravity or pressure differential. Masts are supposed to release both small portions of fluid and large fluid leakages, so sizing is an issue given the different portions.

The known APU drain mast comprises a tube with or without a chamfered end. The drain masts comprise:

a first end configured for being connected to the source of liquid to be evacuated from the aircraft, a second end configured for discharging the liquids to the atmosphere, an internal surface configured for being exposed to the drained liquid, and an external surface that can be exposed to the airflow surrounding the drain mast, that operate in favorable or adverse pressure gradients.

Each mast usually has a receptacle intended to receive the fluid from any source. This receptacle is able to lead the fluid towards the final drain mast. The shape of the mast makes the droplets of fluid run through the internal surface of the piping and finally they are released to the ambient. Therefore, the liquid film runs freely in the inner wall of the pipe.

In case of having small leakages, the droplets are not always released well and frequently once a droplet arrives at the open end of the mast, instead of being released, it adheres to the external surface of the drain mast going up to the fuselage, because when the aircraft is flying, the airflow can be powerful enough to cause the droplet to move to the rear external surface of the drain mast.

In addition to the previously stated drawbacks related to the improper release of the droplets, these masts are also a source of parasite drag to the aircraft.

The invention herein described tries to avoid these phenomena.

SUMMARY OF THE INVENTION

The invention has been applied to the APU compartment but it can also be applied to other areas of the aircraft where drain masts are located.

An object of the invention is to control the droplets' leaking path in order to avoid fuselage contamination without negatively impacting the parasitic drag.

The drain mast object of the invention comprises an internal rim connected to the internal surface of the tube and the rim being located in a plane inclined with respect to the horizontal plane of the aircraft and having its lowest part located on the second end of the tube. The internal rim is therefore located in a plane inclined with respect to a horizontal plane such that drops are moved along it by gravity.

Therefore, drops approaching the open end run by gravity or pressure differential over the internal rim and are guided to the lowest end of the rim due to its inclination.

In case that the tube has an open end also inclined with respect to the horizontal plane of the aircraft, the internal rim can be located at the edge of the open end following the inclination of the edge of the tube. In the case that the end of the tube is located in a horizontal plane, the rim is located in a different plane, a plane being inclined with respect to the edge of the tube but the lowest part of the internal rim is located on the edge of the tube. The rim releases the drops also in the case of adverse pressure gradient in the mast.

The drain mast also comprises an aperture being located at the lowest part of the internal rim for draining the liquid and in the section of the tube facing the incoming airflow when in use. The internal rim and the aperture are configured such that at the second end, the liquid is directed by gravity through the internal rim to the aperture, such that the drainage liquid is pushed by the incoming airflow to the atmosphere.

According to the above, the invention achieves a drain mast that allows the correct release of droplets avoiding the adherence of fluid to the fuselage and it is able to solve the previously mentioned drawbacks by leading the fluid inside the mast, independently of where it runs, to a position where its release is more appropriate.

The invention comprises therefore a mast connectable to the below part of a compartment or a source of liquid that avoids the adherence of droplets to the fuselage by providing an internal rim at the end of the tube that conducts the droplet to a mist area in which an aperture in the rim, in combination with the incoming airflow, sprays the droplets in order to avoid re-adherence to the tail cone fairing.

It is also an object of the present invention to provide an auxiliary power unit of an aircraft comprising a drain mast according to the above technical features and an aircraft comprising a drain mast according to the above technical features.

BRIEF DESCRIPTION OF THE DRAWINGS

FIGS. 1A and 1B are schematic longitudinal and cross sections of a drain mast of the state of the art showing the behavior of a fluid droplet.

FIG. 2 is a schematic longitudinal section of a drain mast according to a first embodiment of the invention.

FIGS. 3A and 3B are a schematic longitudinal section and perspective view of a drain mast according to a second embodiment of the invention.

FIGS. 4A and 4B are a schematic longitudinal section and perspective view of a drain mast according to a third embodiment of the invention.

FIG. 5 is a schematic perspective view of an aircraft and its auxiliary power unit compartment having a drain mast.

FIG. 6 is an enlarged view of the auxiliary power unit compartment and the drain mast of FIG. 5.

DETAILED DESCRIPTION OF THE PREFERRED EMBODIMENTS

FIG. 1A illustrates the basic components of a known drain mast of an APU compartment of an aircraft, the drain mast comprising a tube (1) having a first end (10) connected to the APU compartment and a second end (11) for discharging the liquids to the atmosphere. The APU compartment is usually located in the tail cone of the aircraft close to the fuselage and receives the liquids leaked by the APU.

Figure 1B:
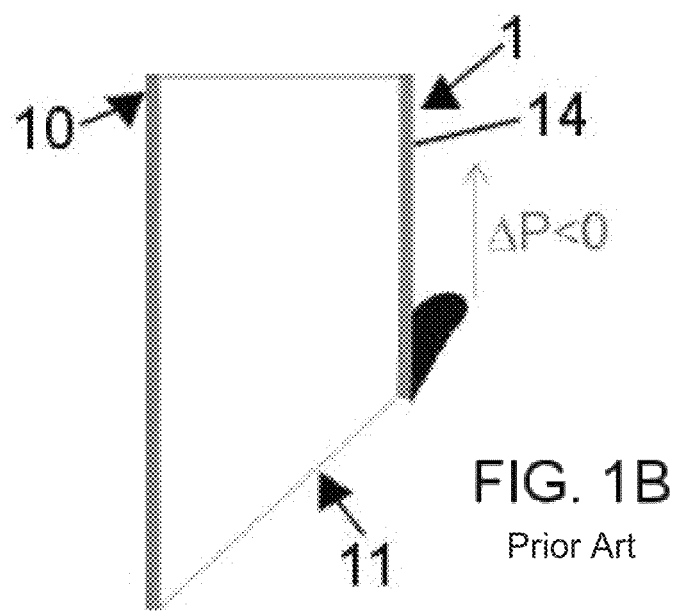

As can be seen in FIG. 1A, the distribution of the airflow in the external surface (14) of the tube (1) opposite to the surface facing the incoming airflow promotes the adherence of the droplets of liquid to the external surface (14) of the tube (1) such that the droplet runs over the external surface (14) as it is depicted in FIG. 1B.

As an alternative, the droplets, instead of running over the external surface of the tube (1), could be firstly ejected from the tube (1) for afterwards being rapidly adhered to the fuselage.

Figure 2:
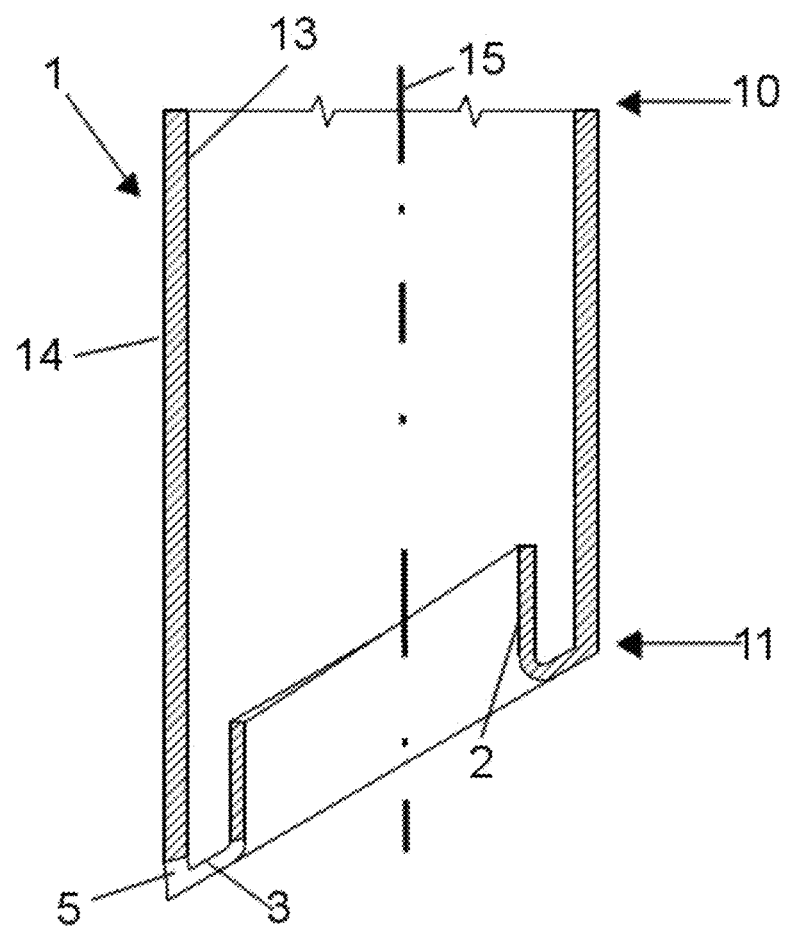

FIG. 2 shows an embodiment of the drain mast (1) that comprises:

the first end (10) connectable to the APU compartment (30) (see, e.g., FIGS. 5 and 6) of the aircraft (although in the depicted embodiment the drain mast (1) is connected to an APU compartment (30), as previously stated other possibilities are possible, like the drain mast being connected to an internal tube intended for the drainage of any liquid);

the second end (11) for discharging the liquids to the atmosphere and located in a plane inclined with respect to the horizontal plane of the aircraft. More specifically, the embodiment shows a tube (1) that has a longitudinal axis (15) perpendicular to the longitudinal axis of the aircraft and with the second end (11) being inclined with respect to the longitudinal axis of the aircraft.

The tube (1) comprises its internal surface (13) exposed to the drained liquid and the external surface (14) exposed to the airflow surrounding the drain mast and:

the internal rim (2) comprising a L-shape and being connected to the internal surface (13) of the tube (1) and having the same inclination that the end of the tube (1), and the aperture (3) located at the front face of the rim (2) and at the lowest part of the inclined second end (11). For front face, it is understood the face of the tube (1) facing the incoming air. In case that the second end (11) has not an inclined surface, the internal rim (2) should have the inclination for allowing drops to move by gravity to the front face.

Additionally, the tube (1) could comprise an aperture (5) located in its surface in communication with the aperture (3) of the internal rim (2) as disclosed in FIG. 2.

Figure 3B:
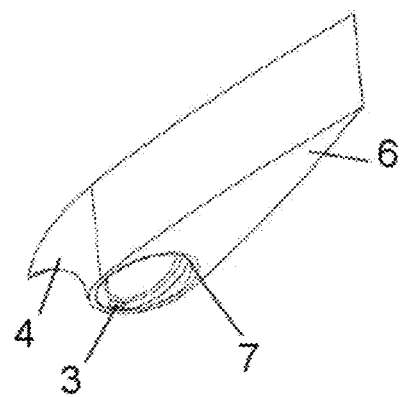
Figure 3A:
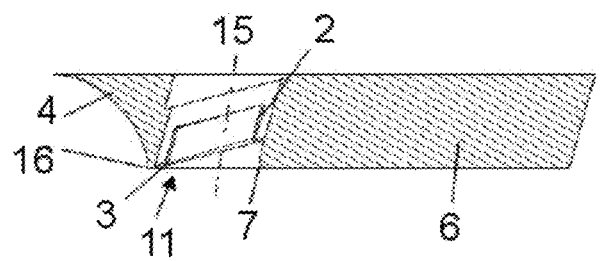
Figure 4B:
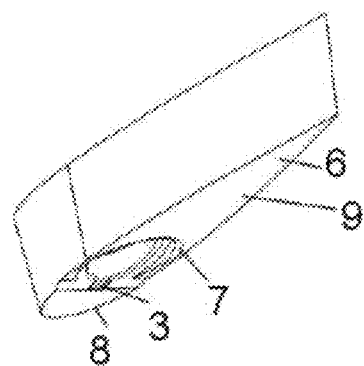
Figure 4A:
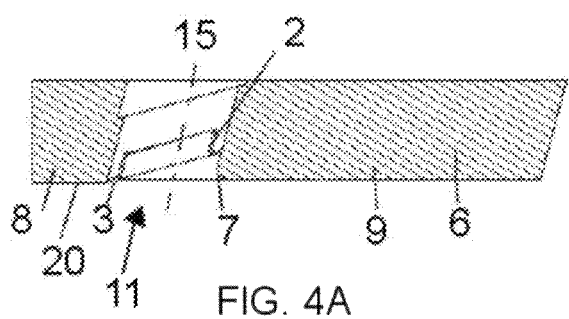

In the embodiments shown in FIGS. 3 and 4, the tube (1) is arranged with its longitudinal axis (15) having an acute angle α with respect to the longitudinal direction of the aircraft. Additionally, the tube (1) does not have its second end (11) inclined with respect to the horizontal plane of the aircraft.

A further embodiment of the invention would comprise a deflector (4) connected to the external surface (14) (see FIG. 3) of the tube (1), more specifically to the surface facing the incoming airflow of the tube (1) that leads the airflow to the second end (11) close to the aperture (3) such that the flow pushes and force the release of the fluid towards down. The deflector (4) comprises its lower end (16) close to the aperture (3) such that the incoming airflow is led by the deflector (4) to the drained liquid flowing from the aperture (3) providing the droplets with a vertical component.

The deflector (4) helps to control the droplets coming from the aperture (3) in order to be expelled out of the fuselage.

The deflector (4) comprises a curved surface in a plane that comprises the longitudinal axis (15) of the tube (1) and also the aperture (3) of the rim (2) of the tube (1). The curved surface is concave with respect to the incoming airflow and therefore pushes the incoming airflow to the aperture (3) such that it confers a vertical component to the droplets getting them away from the fuselage when being ejected from the aperture (3). Vertical component means a component that is perpendicular to the horizontal plane of the aircraft.

Although the drain mast shown in the embodiments is a straight tube (1), other alternatives are possible, for instance, a curved shape.

The embodiments disclosed in FIGS. 3 and 4 additionally show a drain mast that comprises a fairing (6) surrounding the tube (1), the fairing (6) has an external surface configured to be exposed to the incoming flow and having an aerodynamic profile cross-section in order to minimize drag forces. FIG. 3 discloses the combination of a fairing (6) and a deflector (4) and FIG. 4 discloses a fairing (6).

The fairing (6) comprising the aerodynamic profile further helps to control the droplets coming from the aperture (3) in order to be expelled parallel to the fuselage to avoid their adherence to the fuselage. The fairing (6) causes the pressure field behind the tube (1) to be more uniform, therefore correcting vortex separation created either by the tube (1) alone or by the tube (1) and the deflector (4) causing the fluid (air) running immediately after the tube (1) to flow parallel to the surface of the fuselage.

It is recommended that the forward part of the tube (1) be as close as possible to the leading edge (8) of the fairing (6). The effect of it is that, first of all, the air stream pushes the drops down with more energy providing a more efficient drainage and, secondly, the remaining profile (9) corrects the distorted airstream as the tube (1) is located closer to the leading edge (8).

Although all the shown embodiments disclose a tube (1) having a substantially circular cross-section, other configurations are possible, for instance, having a substantially elliptical cross-section, that allows the aperture (3) to be allocated in the most forward position. In fact, the tube (1) could even have an irregular section with the purpose of being located as close as possible to the front face.

The acoustic wave generated by the incoming flow at the exit of the aperture (3) impacts at the internal surface of the tube (1) located diametrically opposed to the aperture (3). As a result, as it is a sharp edge, a disturbing whistling could be produced, and also it could damage the components of the drain mast by acoustic fatigue.

For avoiding these phenomena, two different embodiments are disclosed. FIG. 3 shows a first embodiment in which the tube (1) comprises a rounded edge (7) located at the internal surface of the tube (1) diametrically opposed to the lowest inclined edge of the tube (1).

A second embodiment, that could be combined together with the first one previously stated, is shown in FIG. 4, wherein the fairing (6) comprises a lower wall configured to be parallel to the fuselage of the aircraft and comprising:

a first part (20) located in the same plane of the lowest edge of the second end (11) comprising the aperture (3), and a step towards the first end (10) located between the aperture (3) and its opposite end in the second end (11) such that the internal surface of the tube (1) opposite to the aperture (3) is located in a plane closer to the first end (10) than the first part of the lower wall (20) comprising the aperture (3).

The fairing profile added to the mast removes the vortex separation created behind the tube (1) and therefore, reduces the parasitic drag made by the mast.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A drain mast for draining liquids from an aircraft, the drain mast comprising a tube comprising:
    a first end configured to be connected to a source of liquids to be drained from the aircraft,
    a second end configured to discharge said liquids to the atmosphere,
    an internal surface configured to be exposed to the drained liquid,
    an external surface,
    an internal rim connected to the internal surface of the tube, the internal rim forming a liquid collector about the internal surface of the tube wherein the internal rim is inclined with respect to a longitudinal axis of the aircraft wherein a lowest part of the internal rim is located on the second end of the tube, and
    an aperture to allow evacuation of the liquid, the aperture located at the lowest part of the internal rim at a leading face of the tube which faces an incoming airflow in a direction opposite to a direction of aircraft flight,
    wherein the internal rim and the aperture are configured such that, at the second end, the liquid is directed by gravity through the internal rim to the aperture and wherein the drained liquid flowing from the aperture is pushed by the incoming airflow to the atmosphere.

2. The drain mast for draining liquids according to claim 1 further comprising a deflector connected to the external surface of the tube, the deflector having a leading edge configured to face the incoming air flow and having a lower end in the proximity of the aperture, such that the incoming airflow is led by the deflector to the drained liquid flowing from the aperture providing droplets of the drained liquid flowing from the aperture with a vertical component.

3. The drain mast for draining liquids according to claim 1, wherein the tube further comprises an additional aperture located in a surface of the tube, the additional aperture in communication with the aperture of the internal rim.

4. The drain mast for draining liquids according to claim 1, wherein the longitudinal axis of the tube is perpendicular to the longitudinal axis of the aircraft.

5. The drain mast for draining liquids according to claim 1, wherein the longitudinal axis of the tube is arranged at an acute angle with respect to the longitudinal axis of the aircraft.

6. The drain mast for draining liquids according to claim 1, wherein the internal rim comprises an L-shape.

7. The drain mast for draining liquids according to claim 1, wherein the tube has a substantially circular cross-section.

8. The drain mast for draining liquids according to claim 1, wherein the tube has an elliptical cross-section.

9. The drain mast for draining liquids according to claim 1, further comprising a fairing surrounding the tube with an external surface of the fairing being exposed to the incoming airflow having an aerodynamic profile cross-section.

10. The drain mast for draining liquids according to claim 9, wherein the tube comprises a rounded edge located at the internal surface of the tube diametrically opposed to the lower inclined edge of the rim where the aperture is located.

11. The drain mast for draining liquids according to claim 9, wherein the fairing comprises a lower wall comprising:
    a first part located in the same plane as the lowest edge of the second end of the tube which comprises the aperture, and
    a step towards the first end located between the aperture and its opposite end in the second end, such that the internal surface of the tube opposite to the aperture is located in a plane closer to the first end than the first part of the lowest edge of the second end of the tube which comprises the aperture.

12. An aircraft comprising a drain mast according to claim 1.

13. A drain mast for draining liquids from an aircraft, the drain mast comprising a tube comprising:
    a first end configured to be connected to a source of liquids to be drained from the aircraft,
    a second end configured to discharge said liquids to the atmosphere,
    an internal surface configured to be exposed to the drained liquid,
    an external surface,
    an internal rim connected to the internal surface of the tube, the internal rim wherein the internal rim is inclined with respect to a longitudinal axis of the aircraft wherein a lowest part of the internal rim is located on the second end of the tube, and
    an aperture to allow evacuation of the liquid, the aperture located at the lowest part of the internal rim at a leading face of the tube which faces an incoming airflow in a direction of opposite to a direction of aircraft flight,
    wherein the internal rim and the aperture are configured such that, at the second end, the liquid is directed by gravity through the internal rim to the aperture and wherein the drained liquid flowing from the aperture is pushed by the incoming airflow to the atmosphere,
    wherein the internal rim comprises an L-shape.

14. A drain mast for draining liquids from an aircraft, the drain mast comprising a tube comprising:
    a first end configured to be connected to a source of liquids to be drained from the aircraft,
    a second end configured to discharge said liquids to the atmosphere,
    an internal surface configured to be exposed to the drained liquid,
    an external surface,
    an internal rim connected to the internal surface of the tube, the internal rim wherein the internal rim is inclined with respect to a longitudinal axis of the aircraft wherein a lowest part of the internal rim is located on the second end of the tube,
    an aperture to allow evacuation of the liquid, the aperture located at the lowest part of the internal rim at a leading face of the tube which faces an incoming airflow in a direction of opposite to a direction of aircraft flight, and
    a fairing surrounding the tube with an external surface of the fairing having an aerodynamic profile cross-section and exposed to the incoming airflow, wherein the internal rim and the aperture are configured such that, at the second end, the liquid is directed by gravity through the internal rim to the aperture and wherein the drained liquid flowing from the aperture is pushed by the incoming airflow to the atmosphere,
wherein the tube comprises a rounded edge located at the internal surface of the tube diametrically opposed to the lower inclined edge of the internal rim where the aperture is located.

\* \* \* \* \*